US012762983B2

(12) United States Patent
Pyo

(10) Patent No.: US 12,762,983 B2
(45) Date of Patent: Oct. 13, 2026

(54) VOLTAGE SETTING METHOD FOR DISPLAY DEVICE

(71) Applicant: Samsung Display Co., LTD., Yongin-si (KR)

(72) Inventor: Si Beak Pyo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 2 days.

(21) Appl. No.: 18/824,428

(22) Filed: Sep. 4, 2024

(65) Prior Publication Data

US 2025/0299609 A1 Sep. 25, 2025

(30) Foreign Application Priority Data

Mar. 21, 2024 (KR) ........................ 10-2024-0039165

(51) Int. Cl.
*G09G 3/3233* (2016.01)
*G09G 3/20* (2006.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2330/021* (2013.01); *G09G 2340/0435* (2013.01)

(58) Field of Classification Search
CPC ............... G09G 3/2007; G09G 3/3233; G09G 2300/0819; G09G 2300/0842; G09G 2330/021; G09G 2340/0435; G09G 3/32; G09G 3/3208; G09G 3/3266; G09G 3/3291; G09G 2320/0626; G09G 2310/08; G09G 2320/0233; G09G 2320/0238; G09G 2330/028
See application file for complete search history.

(56) References Cited

U.S. PATENT DOCUMENTS

| | | | | |
|---|---|---|---|---|
| 8,451,554 B2 * | 5/2013 | Kim | .................... | B29C 45/0053 349/155 |
| 8,982,164 B2 * | 3/2015 | Pyo | ...................... | G09G 3/3225 345/212 |
| 9,013,519 B2 * | 4/2015 | Park | ..................... | G09G 3/3225 345/204 |
| 9,478,166 B2 * | 10/2016 | Pyo | ...................... | G09G 3/3233 |
| 9,892,682 B2 * | 2/2018 | Pyo | ...................... | G09G 3/3233 |
| 9,953,573 B2 * | 4/2018 | Pyo | ...................... | G09G 3/3258 |
| 10,643,529 B1 * | 5/2020 | Chien | .................. | G09G 3/3225 |
| 11,100,851 B2 * | 8/2021 | Liu | ...................... | G09G 3/3233 |
| 11,282,432 B2 * | 3/2022 | Pyo | ...................... | G09G 3/2003 |

(Continued)

*Primary Examiner* — Jeff Piziali
(74) *Attorney, Agent, or Firm* — Womble Bond Dickinson (US) LLP

(57) ABSTRACT

There is provided a voltage-setting method for a display for displaying an image based on a selected maximum luminance among maximum luminances, the voltage-setting method including setting emission duty ratios with respect to the maximum luminances, setting first power voltages with respect to the maximum luminances based on a first maximum luminance, setting black data voltages with respect to the maximum luminances based on a second maximum luminance, and setting difference values of anode initialization voltages and the first power voltages with respect to ones of the maximum luminances other than the second maximum luminance based on a third maximum luminance and a fourth maximum luminance.

20 Claims, 10 Drawing Sheets

(56) References Cited

U.S. PATENT DOCUMENTS

| | | | | |
|---|---|---|---|---|
| 11,302,238 | B2 * | 4/2022 | Pyo | G09G 3/2007 |
| 11,322,075 | B2 * | 5/2022 | Pyo | G09G 5/10 |
| 11,430,392 | B2 * | 8/2022 | Tamura | G09G 3/3291 |
| 11,562,698 | B2 * | 1/2023 | Wang | G09G 3/3233 |
| 11,804,164 | B2 * | 10/2023 | Lim | G09G 3/2092 |
| 11,804,173 | B1 * | 10/2023 | Pyo | G09G 3/32 |
| 11,847,950 | B2 * | 12/2023 | Min | G09G 3/2007 |
| 12,293,716 | B2 * | 5/2025 | Zhang | G09G 3/32 |
| 12,334,014 | B2 * | 6/2025 | Pyo | G09G 3/3233 |
| 12,354,542 | B2 * | 7/2025 | Jang | G09G 3/32 |
| 12,387,652 | B2 * | 8/2025 | Farrokh Baroughi | G09G 3/2007 |
| 12,387,665 | B2 * | 8/2025 | Kwon | G09G 3/32 |
| 12,444,374 | B2 * | 10/2025 | Pyo | G09G 3/006 |
| 12,451,043 | B2 * | 10/2025 | Wang | G09G 3/2074 |
| 12,456,428 | B2 * | 10/2025 | Seo | G09G 5/10 |
| 12,505,798 | B2 * | 12/2025 | Yang | G09G 3/3233 |
| 2003/0214467 | A1 * | 11/2003 | Koyama | G09G 3/3233 345/82 |
| 2009/0201231 | A1 * | 8/2009 | Takahara | G09G 3/3233 345/76 |
| 2011/0205202 | A1 * | 8/2011 | Son | G09G 3/3208 345/207 |
| 2013/0176349 | A1 * | 7/2013 | Park | G09G 3/3291 345/690 |
| 2015/0138251 | A1 * | 5/2015 | Pyo | G09G 3/3233 345/82 |
| 2015/0187277 | A1 * | 7/2015 | Maeyama | G09G 3/3225 345/694 |
| 2015/0287362 | A1 * | 10/2015 | Lee | G09G 3/3266 315/173 |
| 2016/0171929 | A1 * | 6/2016 | Lee | G09G 3/3233 345/77 |
| 2016/0275842 | A1 * | 9/2016 | Seok | G09G 3/3233 |
| 2017/0011682 | A1 * | 1/2017 | Pyo | G09G 3/3233 |
| 2017/0076695 | A1 * | 3/2017 | Hwang | G09G 3/3291 |
| 2017/0124958 | A1 * | 5/2017 | Pyo | G09G 3/3233 |
| 2017/0132975 | A1 * | 5/2017 | Park | G09G 3/3233 |
| 2017/0294156 | A1 * | 10/2017 | Pyo | G09G 3/2003 |
| 2019/0304372 | A1 * | 10/2019 | Pyo | H10K 59/1216 |
| 2019/0340981 | A1 * | 11/2019 | Pyo | G09G 3/3291 |

* cited by examiner

FIG. 9

| | MAXIMUM LUMINANCE | EMISSION DUTY RATIO | FIRST POWER VOLTAGE | | | | | | BLACK DATA VOLTAGE | | | | | DIFFERENCE VALUE BETWEEN ANODE INITIALIZATION VOLTAGE AND FIRST POWER VOLTAGE | | |
|---|---|---|---|---|---|---|---|---|---|---|---|---|---|---|---|---|
| | | | TEST LUMINANCE | RANGE | | | | | TEST LUMINANCE | TEST RANGE | OFFSET | | | TEST LUMINANCE | TEST RANGE | |
| | Nits | | | MINIMUM VALUE | ~ | | | MAXIMUM VALUE | | | FIRST COLOR | SECOND COLOR | THIRD COLOR | | VAR_RG | VAR_B |
| ML2 | 2175 | | – | -5.00 | -5.10 | -5.20 | -5.30 | -5.40 | O | 4.8~6.2 | – | – | – | – | Fixed 0.25 | Fixed 1.00 |
| | 1600 | | – | -5.00 | -5.10 | -5.20 | -5.30 | -5.40 | – | | 0 | 0 | 0 | – | | |
| | 1200 | | – | -4.60 | -4.70 | -4.80 | -4.90 | -5.00 | – | | 0 | 0 | 0 | – | | |
| ML1 | 650 | 89% | O | -3.30 | -3.40 | -3.50 | -3.60 | -3.70 | – | | 0 | 0 | 0 | – | FIRST INTERPOLATION | FIRST INTERPOLATION, LUT, OR RELATION |
| | 300 | | – | -2.60 | -2.70 | -2.80 | -2.90 | -3.00 | – | | 0 | 0 | 0 | – | | |
| | 200 | | – | -2.40 | -2.50 | -2.60 | -2.70 | -2.80 | – | | 0 | 0 | 0 | – | | |
| ML3 | 100 | | – | | | | | | – | | 0 | 0 | 0 | O | 0.3~0.5 | 1.05~1.15 |
| | 90 | 80.0% | – | | | | | | – | – | -0.003 | -0.021 | -0.048 | – | | |
| | 60 | 53.5% | – | | | | | | – | | -0.016 | -0.1 | -0.229 | – | | |
| | 30 | 26.8% | – | -2.20 | -2.30 | -2.40 | -2.50 | -2.60 | – | | -0.038 | -0.232 | -0.526 | – | SECOND INTERPOLATION | SECOND INTERPOLATION, LUT, RELATION |
| | 15 | 13.4% | – | | | | | | – | | -0.059 | -0.362 | -0.808 | – | | |
| ML4 | 10 | 8.9% | – | | | | | | – | | -0.072 | -0.436 | -0.965 | O | 0.5~1.2 | 1.15~1.50 |
| | 4 | 8.9% | – | | | | | | – | | -0.072 | -0.436 | -0.965 | – | DITTO | DITTO |

FIG. 10

| VAR_LUT | |
|---|---|
| T_VAR_RG | T_VAR_B |
| 0.25 | 1.00 |
| 0.30 | 1.05 |
| 0.40 | 1.10 |
| 0.50 | 1.15 |
| 0.60 | 1.20 |
| 0.70 | 1.25 |
| 0.80 | 1.30 |
| 0.90 | 1.35 |
| 1.00 | 1.40 |
| 1.10 | 1.45 |
| 1.20 | 1.50 |

FIG. 13

| | MAXIMUM LUMINANCE | EMISSION DUTY RATIO | FIRST POWER VOLTAGE | | | | | | BLACK DATA VOLTAGE | | | | | DIFFERENCE VALUE BETWEEN ANODE INITIALIZATION VOLTAGE AND FIRST POWER VOLTAGE | | | |
|---|---|---|---|---|---|---|---|---|---|---|---|---|---|---|---|---|---|
| | | | TEST LUMINANCE | RANGE | | | | | TEST LUMINANCE | TEST RANGE | OFFSET | | | TEST LUMINANCE | TEST RANGE | | |
| | Nits | | | MINIMUM VALUE | ~ | | | MAXIMUM VALUE | | | FIRST COLOR | SECOND COLOR | THIRD COLOR | | VAR_R | VAR_G | VAR_B |
| ML2 | 2175 | | - | -5.00 | -5.10 | -5.20 | -5.30 | -5.40 | O | 4.8~6.2 | - | - | - | - | Fixed a1 | Fixed b1 | Fixed c1 |
| | 1600 | | - | -5.00 | -5.10 | -5.20 | -5.30 | -5.40 | - | | 0 | 0 | 0 | - | | | |
| | 1200 | | - | -4.60 | -4.70 | -4.80 | -4.90 | -5.00 | - | | 0 | 0 | 0 | - | | | |
| ML1 | 650 | 89% | O | -3.30 | -3.40 | -3.50 | -3.60 | -3.70 | - | | 0 | 0 | 0 | - | FIRST INTERPOLATION | FIRST INTERPOLATION, LUT, OR RELATION | FIRST INTERPOLATION, LUT, OR RELATION |
| | 300 | | - | -2.60 | -2.70 | -2.80 | -2.90 | -3.00 | - | | 0 | 0 | 0 | - | | | |
| | 200 | | - | -2.40 | -2.50 | -2.60 | -2.70 | -2.80 | - | | 0 | 0 | 0 | - | | | |
| ML3 | 100 | | - | | | | | | - | | 0 | 0 | 0 | O | a21~a22 | b21~b22 | c21~c22 |
| | 90 | 80.0% | - | | | | | | - | - | -0.003 | -0.021 | -0.048 | - | | | |
| | 60 | 53.5% | - | | | | | | - | | -0.016 | -0.1 | -0.229 | - | | | |
| | 30 | 26.8% | - | -2.20 | -2.30 | -2.40 | -2.50 | -2.60 | - | | -0.038 | -0.232 | -0.526 | - | SECOND INTERPOLATION | SECOND INTERPOLATION, LUT, RELATION | SECOND INTERPOLATION, LUT, RELATION |
| | 15 | 13.4% | - | | | | | | - | | -0.059 | -0.362 | -0.808 | - | | | |
| ML4 | 10 | 8.9% | - | | | | | | - | | -0.072 | -0.436 | -0.965 | O | a31~a32 | b31~b32 | c31~c32 |
| | 4 | 8.9% | - | | | | | | - | | -0.072 | -0.436 | -0.965 | - | DITTO | DITTO | DITTO |

VOLTAGE SETTING METHOD FOR DISPLAY DEVICE

CROSS-REFERENCE TO RELATED APPLICATION

The present application claims priority to, and the benefit of, Korean patent application No. 10-2024-0039165 filed on Mar. 21, 2024, in the Korean Intellectual Property Office, the entire disclosure of which is incorporated herein by reference.

BACKGROUND

1. Field

The present disclosure generally relates to a voltage-setting method for a display device.

2. Description of the Related Art

With the development of information technologies, the importance of a display device, which is a connection medium between a user and information, increases. Accordingly, display devices, such as a liquid crystal display device and an organic light-emitting display device, are increasingly used.

To reduce manufacturing cost, a plurality of display devices may be concurrently or substantially simultaneously formed on a large-area mother substrate, and may be separated into individual display devices by scribing these display devices.

However, these individual display devices may include elements having different driving characteristics according to positions on the mother substrate or another cause. Therefore, a problem may occur in that, when voltages having the same magnitude are collectively set with respect to all the display devices, light is not emitted with a luminance corresponding to a grayscale.

To solve this, voltages were conventionally set to have a large voltage margin. Therefore, unnecessary power consumption of the individual display devices may be increased.

SUMMARY

Embodiments provide a voltage-setting method for a display device, which can reduce or prevent the likelihood of black excitation.

In accordance with an aspect of the present disclosure, there is provided a voltage-setting method for a display device for displaying an image based on a selected maximum luminance among maximum luminances, the voltage-setting method including setting emission duty ratios with respect to the maximum luminances, setting first power voltages with respect to the maximum luminances based on a first maximum luminance, setting black data voltages with respect to the maximum luminances based on a second maximum luminance, and setting difference values of anode initialization voltages and the first power voltages with respect to ones of the maximum luminances other than the second maximum luminance based on a third maximum luminance and a fourth maximum luminance.

The second maximum luminance, the third maximum luminance, and the fourth maximum luminance may be different.

The second maximum luminance may be greater than each of the third maximum luminance and the fourth maximum luminance.

The second maximum luminance may be a maximum value among the maximum luminances.

The voltage-setting method may further include setting a same first power voltage with respect to ones of the maximum luminances that are less than or equal to the third maximum luminance.

The voltage-setting method may further include setting a same emission duty ratio with respect to ones of the maximum luminances that are greater than or equal to the third maximum luminance.

The voltage-setting method may further include setting at least one maximum luminance, for which a smallest one of the emission duty ratios is set, as the fourth maximum luminance.

The voltage-setting method may further include setting a largest one of the at least one maximum luminance as the fourth maximum luminance.

The voltage-setting method may further include setting first difference values with respect to maximum luminances that are less than the second maximum luminance and that are greater than the third maximum luminance, and performing first interpolation using a difference value set with respect to the second maximum luminance and a difference value set with respect to the third maximum luminance.

The first interpolation may be performed such that a difference between the first difference values is proportional to a difference between first power voltages with respect to corresponding maximum luminances.

The voltage-setting method may further include setting second difference values with respect to maximum luminances less than the third maximum luminance and greater than the fourth maximum luminance, and performing second interpolation using a difference value set with respect to the third maximum luminance and a difference value set with respect to the fourth maximum luminance.

The second interpolation may be performed such that a difference between the second difference values is proportional to a difference between emission duty ratios with respect to corresponding maximum luminances.

The voltage-setting method may further include selecting a difference value of an anode initialization voltage and a first power voltage with respect to the second maximum luminance, repeatedly testing arbitrary black data voltages based on the difference value with respect to the second maximum luminance, setting a black data voltage with respect to the second maximum luminance, and displaying a black image.

The voltage-setting method may further include applying offsets based on the black data voltage with respect to the second maximum luminance, and setting black data voltages with respect to other ones of the maximum luminances.

The voltage-setting method may further include repeatedly testing arbitrary difference values based on a black data voltage set with respect to the third maximum luminance, setting a difference value with respect to the third maximum luminance, and displaying a black image.

The voltage-setting method may further include repeatedly testing arbitrary difference values based on a black data voltage set with respect to the fourth maximum luminance, setting a difference value with respect to the fourth maximum luminance, and displaying a black image.

The voltage-setting method may further include setting first difference values with respect to maximum luminances less than the second maximum luminance and greater than the third maximum luminance, performing first interpolation using the difference value set with respect to the second maximum luminance and the difference value set with respect to the third maximum luminance such that a difference between the first difference values is in proportion to a difference between first power voltages with respect to corresponding maximum luminances.

The voltage-setting method may further include setting second difference values with respect to maximum luminances less than the third maximum luminance and greater than the fourth maximum luminance, and performing second interpolation using the difference value set with respect to the third maximum luminance and the difference value set with respect to the fourth maximum luminance, and wherein the second interpolation is performed such that a difference between the second difference values is in proportion to a difference between emission duty ratios with respect to corresponding maximum luminances.

The first maximum luminance, the second maximum luminance, the third maximum luminance, and the fourth maximum luminance may be different.

The second maximum luminance may be greater than each of the first maximum luminance, the third maximum luminance, and the fourth maximum luminance.

BRIEF DESCRIPTION OF THE DRAWINGS

FIGS. 8 to 12 are diagrams illustrating a voltage-setting method in accordance with one or more embodiments of the present disclosure.

FIG. 13 is a diagram illustrating a voltage-setting method in accordance with one or more other embodiments of the present disclosure.

DETAILED DESCRIPTION

Figure 1:
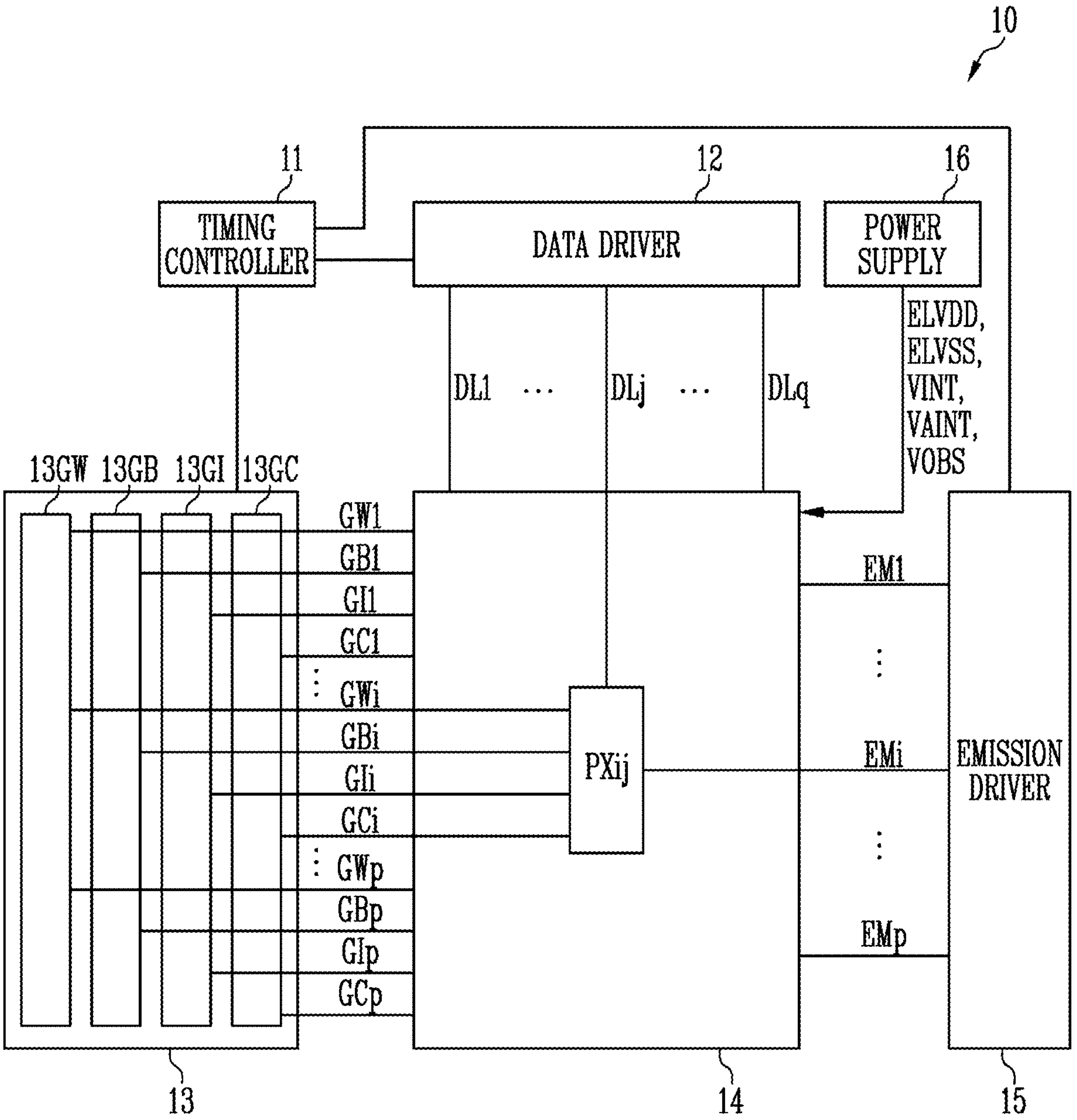
FIG. 1 is a diagram illustrating a display device in accordance with one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing one or more embodiments corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component. Other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B.

Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Also, the expression "equal" may mean "substantially equal." That is, this may mean equality to a degree to which those skilled in the art can understand the equality. Other expressions may be expressions in which "substantially' is omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device in accordance with one or more embodiments of the present disclosure.

Referring to FIG. 1, the display device 10 may include a timing controller 11, a data driver 12, a scan driver 13, a pixel unit 14, an emission driver 15, and a power supply 16.

The timing controller 11 may receive grayscales of an input image (or input frame). The grayscales may include a first color grayscale, a second color grayscale, and a third color grayscale. The first color grayscale may be a grayscale for expressing a first color, the second color grayscale may be a grayscale for expressing a second color, and the third color grayscale may be a grayscale for expressing a third color.

Also, the timing controller 11 may receive a control signal for an image. The control signal may include a horizontal synchronization signal Hsync, a vertical synchronization signal Vsync, and/or a data enable signal. The vertical synchronization signal may include a plurality of pulses, and may indicate that a previous frame period is ended, and that a current frame period is started with respect to a time at which each of the pulses is generated. An interval between adjacent pulses of the vertical synchronization signal may correspond to one frame period. The horizontal synchronization signal may include a plurality of pulses, and may indicate that a previous horizontal period is ended and a new horizontal period is started with respect to a time at which each of the pulses is generated. An interval between adjacent pulses of the horizontal synchronization signal may correspond to one horizontal period. The data enable signal may have an enable level in specific horizontal periods and have a disable level with respect to the other period. When the data enable signal has the enable level, this indicates that color grayscales are supplied in the corresponding periods.

The timing controller 11 may provide the data driver 12 with grayscales rendered or corrected to be suitable for specifications of the display device 10. Also, the timing controller 11 may provide the scan driver 13 with a clock signal, a scan start signal, and the like. The timing controller 11 may provide the emission driver 15 with a clock signal, an emission stop signal, and the like.

The data driver 12 may generate data voltages to be provided to data lines DL1, . . . , DLj, . . . , and DLq, using grayscales and control signals, which are received from the timing controller 11. The data driver 12 may sample grayscales, using a clock signal, and apply data voltages corresponding to the grayscales to the data lines in units of pixel rows. Here, q may be an integer greater than 2, and j may be an integer greater than 1 and less than q.

Magnitudes of the data voltages may vary according to a corresponding grayscale. The data voltages may include a black data voltage. The black data voltage may be a data voltage which is to be written to a pixel when the pixel displays a black image. For example, the black data voltage may correspond to a minimum grayscale (e.g., grayscale 0).

The magnitudes of the data voltages may vary according to a maximum luminance. The maximum luminance may be a luminance of light emitted from pixels set to a maximum grayscale (e.g., grayscale 255 when grayscales are expressed with 8 bits). For example, the maximum luminance may be a luminance of white light generated as all pixels of the pixel unit 14 emit light to correspond to a white grayscale. A unit of luminance may be nits. The maximum luminance may be referred to as a display brightness value. The maximum luminance may be manually set by manipulation of a user on the display device 10, or be automatically set by an algorithm linked with an illumination sensor or the like. For example, a maximum value of the maximum luminance may be about 2175 nits, and a minimum value of the maximum luminance may be about 4 nits. The maximum value and the minimum value of the maximum luminance may be variously set according to products. Even with respect to the same grayscale, a data voltage varies according to the maximum luminance, and therefore, an emission luminance of the pixel also varies.

The scan driver 13 may include first to fourth scan drivers 13GW, 13GB, 13GI, and 13GC. The first scan driver 13GW may provide first scan signals to first scan lines GW1, . . . , GWi, . . . , and GWp. Here, p may be an integer greater than 2, and i may be an integer greater than 1 and less than p. The second scan driver 13GB may provide second scan signals to second scan lines GB1, . . . , GBi, . . . , and GBp. The third scan driver 13GI may provide third scan signals to third scan lines GI1, . . . , GIi, . . . , GIp. The fourth scan driver 13GC may provide fourth scan signals to fourth scan lines GC1, . . . , GCi, . . . , and GCp.

For example, the first scan driver 13GW may generate the first scan signals to be supplied to the first scan lines GW1 to GWp by receiving at least one scan clock signal and a scan start signal from the timing controller 11. The first scan driver 13GW may sequentially provide the first scan signals having a pulse of a turn-on level to the first scan lines GW1 to GWp. For example, the first scan driver 13GW may be configured in the form of shift registers, and may generate the first scan signals in a manner that sequentially transfers the scan start signal in the form of a pulse of a turn-on level to a next scan stage under the control of the scan clock signal.

Each of the second scan driver 13GB, the third scan driver 13GI, and the fourth scan driver 13GC may be configured similarly to the first scan driver 13GW, and therefore, overlapping descriptions will be omitted. In some embodiments, at least some of the first to fourth scan drivers 13GW, 13GB, 13GI, and/or 13GC may be integrated. For example, when pulses have the same polarity and the same width, two or more scan drivers may be integrated. For example, referring to FIG. 5, a pulse of a turn-on level, which is applied to a third scan line GIi at a time t2*a*, and a pulse of a turn-on level, which is applied to a fourth scan line GCi at a time t3*a*, have the same polarity and the same width, and therefore, the third scan driver 13GI and the fourth scan driver 13GC may be integrally configured.

The emission driver 15 may generate emission signals to be provided to emission lines EM1, . . . , EMi, . . . , and EMp by receiving at least one emission clock signal and an emission stop signal from the timing controller 11. The emission driver 15 may sequentially provide the emission signals having a pulse of a turn-off level to the emission lines EM1 to EMp. For example, the emission driver 15 may be configured in the form of shift registers, and may generate the emission signals in a manner that sequentially transfer the emission stop signal in the form of a pulse of a turn-off level to a next emission stage under the control of the emission clock signal.

In FIG. 1, it is illustrated that the number of each of the first scan lines GW1 to GWp, the second scan lines GB1 to GBp, the third scan lines GI1 to GIp, the fourth scan lines GC1 to GCp, and the emission lines EM1 to EMp is p. However, in one or more other embodiments, the number of at least one of the second scan lines GB1 to GBp, the third scan lines GI1 to GIp, the fourth scan lines GC1 to GCp, and/or the emission lines EM1 to EMp may be p/2 or less. For example, two adjacent pixel rows may share one second scan line. Similarly, two adjacent pixel rows may share one third scan line, one fourth scan line, or one emission line. The same pixel row means pixels connected to the same first scan line.

The pixel unit 14 may include pixels. Each pixel PXij may be connected to a corresponding data line DLj, corresponding scan lines GWi, GBi, GIi, and GCi, and a corresponding emission line EMi. Each pixel PXij may include a light-emitting element for emitting light based on a received data voltage.

The pixel unit 14 may include first pixels emitting light of the first color, second pixels emitting light of the second color, and third pixels emitting light of the third color. The first color, the second color, and the third color may be different colors. For example, the first color may be one color among red, green, and blue, the second color may be another color instead of the first color among red, green, and blue, and the third color may be the other color instead of the first color and the second color among red, green, and blue. In addition, magenta, cyan, and yellow instead of red, green, and blue may be used as the first to third colors. Hereinafter, for convenience of description, it is described that the first color is red, the second color is green, and the third color is blue.

The pixels of the pixel unit 14 may be arranged in various forms, such as diamond PENTILE™, RGB-stripe, S-stripe, real RGB, and normal PENTILE™ (PENTILE™ being a registered trademark of Samsung Display Co., Ltd., Republic of Korea).

The power supply 16 may provide voltages commonly supplied to the pixels of the pixel unit 14. For example, the power supply 16 may provide a first power voltage ELVSS, a second power voltage ELVDD, an initialization voltage VINT, an anode initialization voltage VAINT, and a bias voltage VOBS. For example, the power supply 16 may be a power management integrated circuit (PMIC). For example, the power supply 16 may be configured with a plurality of DC-DC converters.

In some embodiments, the timing controller 11 and the data driver 12 may be integrated into one integrated circuit. In addition, the timing controller 11, the data driver 12, and the power supply 16 may be integrated into one integrated circuit. In addition, the timing controller 11, the data driver 12, the power supply 16, the scan driver 13, and the emission driver 15 may be integrated into one integrated circuit. As such, whether components are to be configured integrally or separately may be variously determined according to products.

Figure 2:
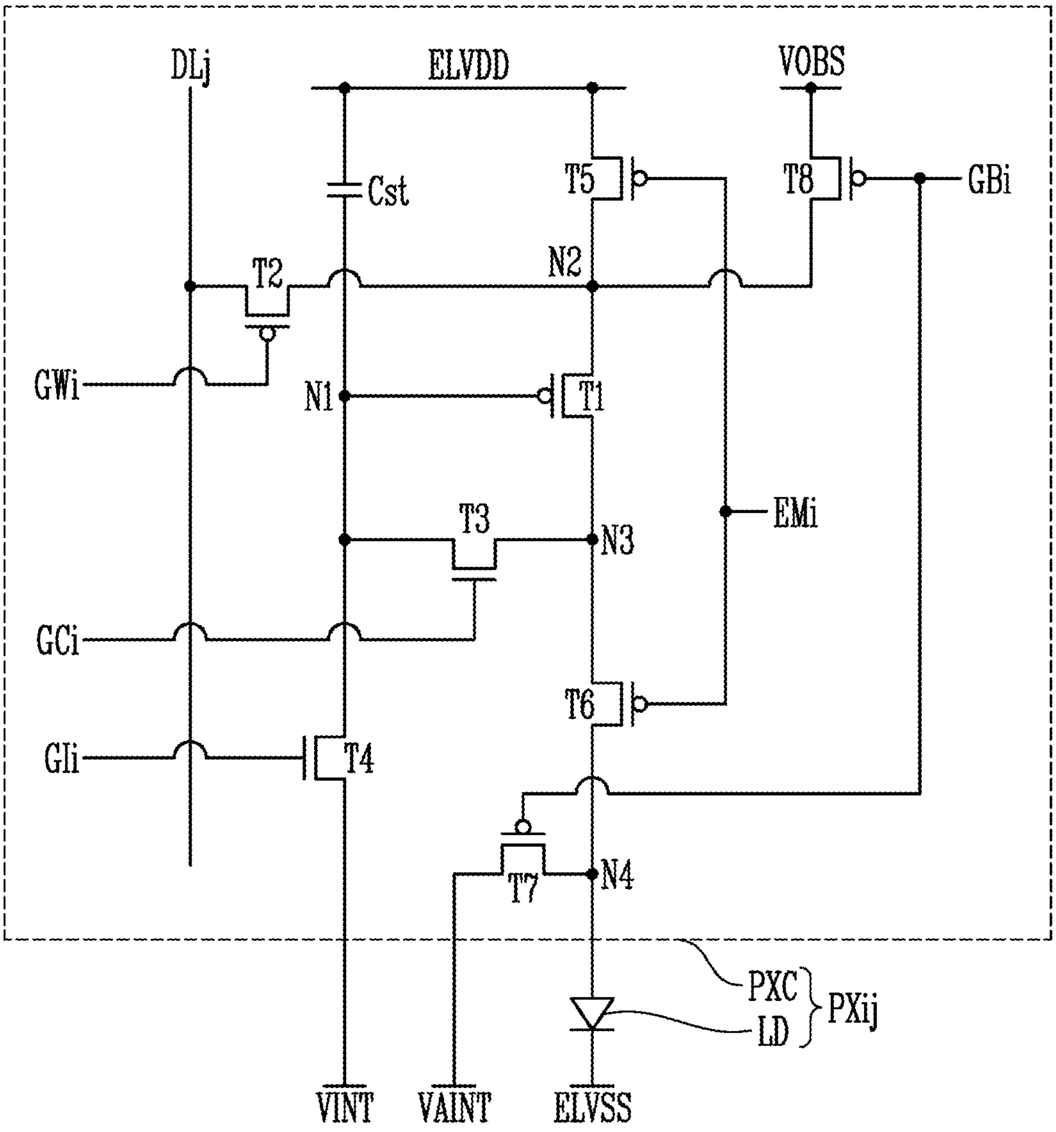
FIG. 2 is a diagram illustrating a pixel in accordance with one or more embodiments of the present disclosure.

FIG. 2 is a diagram illustrating a pixel in accordance with one or more embodiments of the present disclosure.

Referring to FIG. 2, the pixel PXij may include a pixel circuit PXC and a light-emitting element LD. The pixel circuit PXC may include transistors T1, T2, T3, T4, T5, T6, T7, and T8 and a storage capacitor Cst.

The pixel PXij may be located on an ith pixel row and may be located on a jth pixel column. The pixel PXij may be a first pixel for expressing a first color. A second pixel for expressing a second color and a third pixel for expressing a third color may be configured identically to the first pixel, and therefore, overlapping descriptions will be omitted.

P-type transistors may be poly-silicon semiconductor transistors. In the poly-silicon semiconductor transistor, a channel of an active layer may include a poly-silicon semiconductor. For example, the poly-silicon semiconductor transistor may be a Low Temperature Poly-Silicon (LTPS) thin film transistor. The poly-silicon semiconductor transistor has a high electron mobility, and has a fast driving characteristic according to the high electron mobility.

N-type transistors may be oxide semiconductor transistors. In the oxide semiconductor transistor, a channel of an active layer may include an oxide semiconductor. For example, the oxide semiconductor transistor may be a Low Temperature Polycrystalline Oxide (LTPO) thin film transistor. The oxide semiconductor transistor has a low charge mobility as compared with the poly-silicon semiconductor transistor. Therefore, an amount of leakage current generated in a turn-off state of the oxide semiconductor transistors may be small as compared with the poly-silicon semiconductor transistor.

A gate electrode of a first transistor T1 may be connected to a first node N1, a first electrode of the first transistor T1 may be connected to a second node N2, and a second electrode of the first transistor T1 may be connected to a third node N3. The first transistor T1 may be a driving transistor. The first transistor T1 may be a P-type transistor.

A gate electrode of a second transistor T2 may be connected to a first scan line GWi, a first electrode of the second transistor T2 may be connected to a data line DLj, and a second electrode of the second transistor T2 may be connected to the second node N2.

The first scan driver 13GW may provide a first scan signal of a turn-on level, which determines a time at which the pixel PXij receives a data voltage. For example, the second transistor T2 receiving the first scan signal of the turn-on level may be turned on. The second transistor T2 may apply, to the second node N2, a data voltage applied to the data line DLj.

A gate electrode of a third transistor T3 may be connected to a fourth scan line GCi, a first electrode of the third transistor T3 may be connected to the first node N1, and a second electrode of the third transistor T3 may be connected to the third node N3. The third transistor T3 may be a diode connection transistor. The third transistor T3 may be an N-type transistor.

A gate electrode of a fourth transistor T4 may be connected to a third scan line GIi, a first electrode of the fourth transistor T4 may be connected to the first node N1, and a second electrode of the fourth transistor T4 may receive an initialization voltage VINT. The fourth transistor T4 may be a gate initialization transistor. The fourth transistor T4 may be an N-type transistor.

A gate electrode of a fifth transistor T5 may be connected to an emission line EMi, a first electrode of the fifth transistor T5 may receive a second power voltage ELVDD, and a second electrode of the fifth transistor T5 may be connected to the second node N2. The fifth transistor T5 may be a first emission control transistor. The fifth transistor T5 may be a P-type transistor.

A gate electrode of a sixth transistor T6 may be connected to the emission line EMi, a first electrode of the sixth transistor T6 may be connected to the third node N3, and a second electrode of the sixth transistor T6 may be connected to a fourth node N4. The sixth transistor T6 may be a second emission control transistor. The sixth transistor T6 may be a P-type transistor.

A gate electrode of a seventh transistor T7 may be connected to a second scan line GBi, a first electrode of the seventh transistor T7 may receive an anode initialization voltage VAINT, and a second electrode of the seventh transistor T7 may be connected to the fourth node N4. The seventh transistor T7 may be an anode initialization transistor. The seventh transistor T7 may be a P-type transistor. A magnitude of the anode initialization voltage VAINT may be different from a magnitude of the initialization voltage VINT.

The anode initialization voltage VAINT may be differently set according to a kind of the light-emitting element LD. A difference in emission start time may exist according to the kind of the light-emitting element LD, and a color smear phenomenon may occur due to the difference in emission start time. For example, magnitudes of an anode initialization voltage VAINT for a light-emitting element LD of the first color, an anode initialization voltage VAINT for a light-emitting element LD of the second color, and an anode initialization voltage VAINT for a light-emitting element LD of the third color may be set to be different from one another. In one or more other embodiments, anode initialization voltages VAINT for light-emitting elements LD of two colors may be set to be the same, and an anode initialization voltage VAINT for a light-emitting element LD of the other color may be set to be different from the anode initialization voltages VAINT for the light-emitting elements LD of the two colors. In still one or more other embodiments, anode initialization voltages VAINT for all light-emitting elements LD may be set to be the same. Accordingly, the difference in emission start time between the light-emitting elements LD of the respective colors is adjusted, thereby reducing or preventing the color smear phenomenon.

The second scan driver 13GB may provide a second scan signal of a turn-on level, which determines a timing at which an anode voltage of the light-emitting element LD is initialized. For example, the second transistor T7 receiving the second scan signal of the turn-on level may be turned on, and the anode initialization voltage VAINT may be applied to an anode of the light-emitting element LD, so that the anode voltage of the light-emitting element LD is initialized to the anode initialization voltage VAINT.

A gate electrode of an eighth transistor T8 may be connected to the second scan line GBi, a first electrode of the eighth transistor T8 may receive a bias voltage VOBS, and a second electrode of the eighth transistor T8 may be connected to the second node N2. The eighth transistor T8 may be a bias transistor. The eighth transistor T8 may be a P-type transistor.

A first electrode of the storage capacitor Cst may receive the second power voltage ELVDD, and a second electrode of the storage capacitor Cst may be connected to the first node N1.

The anode of the light-emitting element LD may be connected to the fourth node N4, and a cathode of the light-emitting element LD may receive a first power voltage ELVSS. The light-emitting element LD may emit light of one of the first color, the second color, and the third color. The light-emitting element LD may be a light-emitting diode. The light-emitting element LD may be configured as an organic light-emitting diode, an inorganic light-emitting diode, a quantum dot/well light-emitting diode, or the like. In one or more embodiments, one light-emitting element LD is provided in each pixel. However, in one or more other embodiments, a plurality of light-emitting elements may be provided in each pixel. The plurality of light-emitting elements may be connected in series, parallel, series/parallel, or the like.

Figure 3:
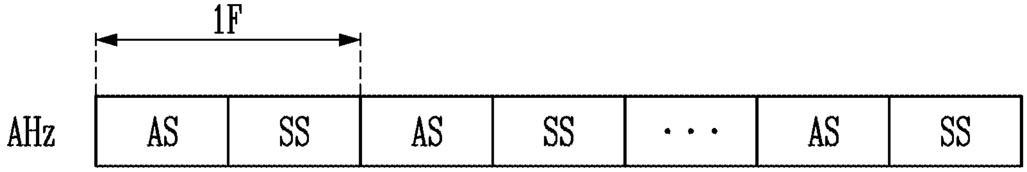
FIGS. 3 and 4 are diagrams illustrating display frequency change in accordance with one or more embodiments of the present disclosure.
Figure 4:
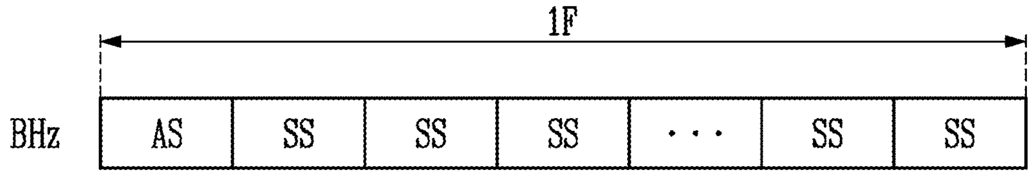

FIGS. 3 and 4 are diagrams illustrating display frequency change in accordance with one or more embodiments of the present disclosure.

The display device 10 may support a Variable Refresh Rate VRR. A refresh rate is a frequency at which a data voltage is written to the pixel PXij, and is referred to as a screen scan rate or a screen refresh rate. The refresh rate may represent a number of image frames reproduced for one second.

For example, the pixel unit 14 may display an image at a first frequency (AHz) in a first mode (see FIG. 3), and may display an image at a second frequency (BHz) that is lower than the first frequency (AHz) in a second mode (see FIG. 4).

For example, each frame period 1F in the first mode may include one address scan period AS and one self-scan period SS with respect to each pixel PXij. For example, each frame period 1F in the second mode may include one address scan period AS and a plurality of self-scan periods SS with respect to each pixel PXij. As the second frequency (BHz) becomes less, the number of self-scan periods SS included in one frame period 1F may increase. In another example, each frame period 1F in a third mode may include only one address scan period AS with respect to each pixel PXij, and include no self-scan period SS.

The address scan period AS is a period in which a data voltage is written to the pixel PXij. The address scan period AS may be referred to as a data programming period in which a data voltage is received from the data line DLj.

The self-scan period SS is a period in which no data voltage is written to the pixel PXij. During an emission period of the self-scan period SS, the pixel PXij may emit light, using the data voltage written in the address scan period AS. A length of the self-scan period SS may be about equal to a length of the address scan period AS.

Figure 5:
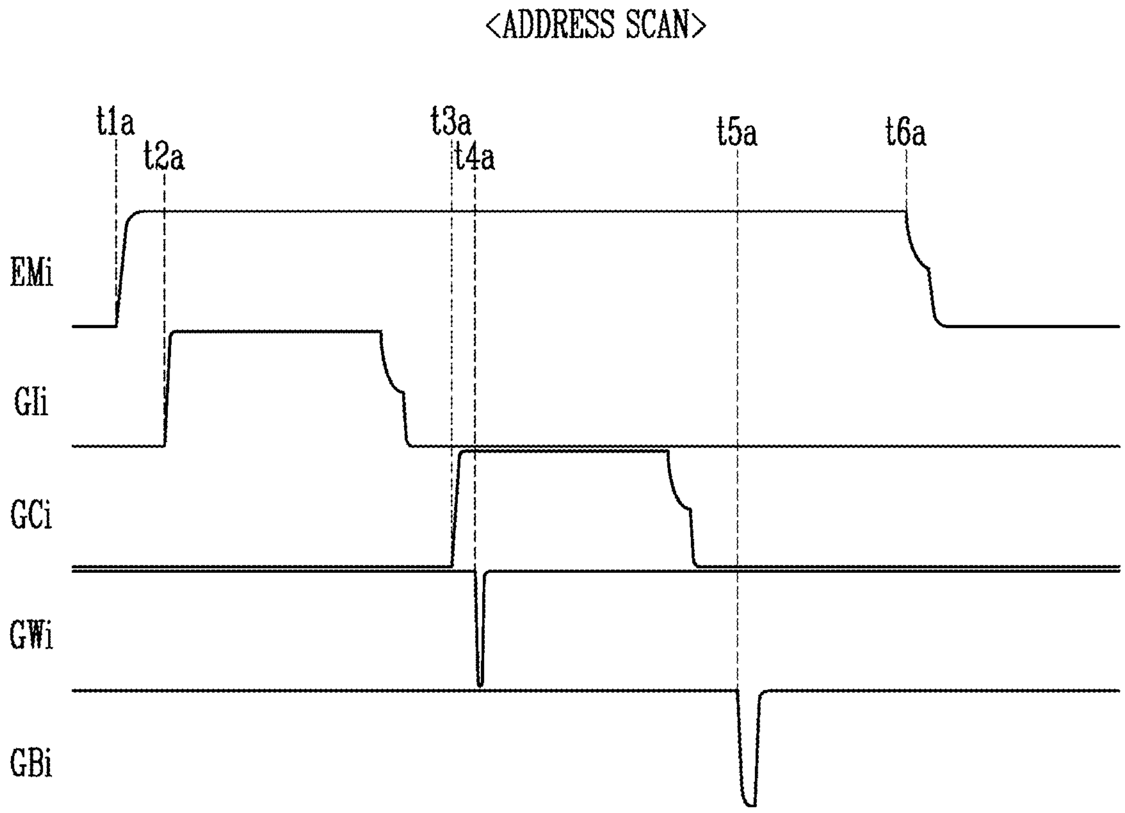
FIG. 5 is a diagram illustrating an address scan period in accordance with one or more embodiments of the present disclosure.

FIG. 5 is a diagram illustrating an address scan period in accordance with one or more embodiments of the present disclosure. FIG. 5 will be described with reference to the pixel PXij shown in FIG. 2.

At a time t1*a*, as an emission signal of a turn-off level (high level) is applied to the emission line EMi, the fifth transistor T5 and the sixth transistor T6 may be turned off, so that the pixel PXij is in a non-emission state.

At a time t2*a*, as a third scan signal of a turn-on level (high level) is applied to the third scan line GIi, the fourth transistor T4 may be turned on. Accordingly, the initialization voltage VINT may be applied to the first node N1. The initialization voltage VINT is a sufficiently low voltage, and may allow the first transistor T1 to be on-biased.

At a time t3*a*, as a fourth scan signal of a turn-on level (high level) is applied to the fourth scan line GCi, the third transistor T3 may be turned on. Therefore, the first transistor T1 is in a diode-connection state in which a drain electrode and the gate electrode thereof are connected to each other.

At a time t4*a*, as a scan signal of a turn-on level (low level) is applied to the first scan line GWi, the second transistor T2 may be turned on. Therefore, a data voltage of the data line DLj may be applied to the first node N1 through the second transistor T2, the first transistor T1, and the third transistor T3, which are in a turn-on state. The voltage of the first node N1 may be a compensation voltage obtained by subtracting a threshold voltage of the first transistor T1 from the data voltage. The storage capacitor Cst may maintain a difference between the second power voltage ELVDD and the compensation voltage.

At a time t5*a*, as a scan signal of a turn-on level (low level) is applied to the second scan line GBi, the seventh transistor T7 and the eighth transistor T8 may be turned on. As the seventh transistor T7 is turned on, the anode initialization voltage VAINT may be applied to the anode of the light-emitting element LD, and the light-emitting element LD may be initialized to a charge quantity corresponding to a voltage difference between the anode initialization voltage VAINT and the first power voltage ELVSS. Accordingly, low grayscale expression of the light-emitting element LD can be readily performed.

In addition, as the eighth transistor T8 is turned on, a voltage of the second node N2 may be set as the bias voltage VOBS. Accordingly, because the bias voltage VOBS is applied to a source electrode of the first transistor T1, a hysteresis phenomenon can be reduced or prevented, and an on-bias state can be ensured.

At a time t6*a*, as an emission signal of a turn-on level (low level) is applied to the emission line EMi, the fifth transistor T5 and the sixth transistor T6 may be turned on. Therefore, a path of driving current may be formed, which flows toward the first power voltage ELVSS from the second power voltage ELVDD via the fifth transistor T5, the first transistor T1, the sixth transistor T6, and the light-emitting element LD.

An amount of driving current may be adjusted according to a voltage maintained in the storage capacitor Cst. The light-emitting element LD may emit light with a luminance corresponding to the amount of driving current. The light-emitting element LD may emit light until before the emission signal of the turn-off level is applied to the emission line EMi.

Figure 6:
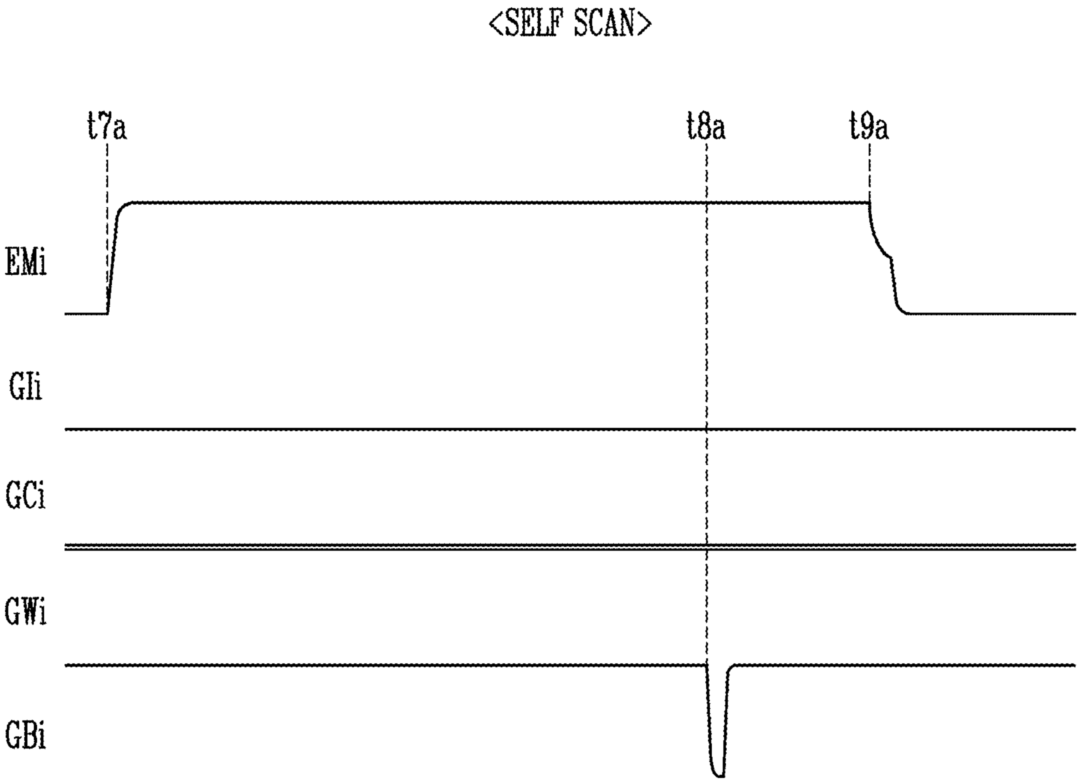
FIG. 6 is a diagram illustrating a self-scan period in accordance with one or more embodiments of the present disclosure.

FIG. 6 is a diagram illustrating a self-scan period in accordance with one or more embodiments of the present disclosure. FIG. 6 will be described with reference to the pixel PXij shown in FIG. 2.

At a time t7*a*, as an emission signal of a turn-off level (high level) is applied to the emission line EMi, the fifth transistor T5 and the sixth transistor T6 may be turned off, so that the pixel PXij is in the non-emission state.

During a period t7*a* to *t*8*a*, scan signals of a turn-off level may be maintained in the first scan line GWi, the third scan line GIi, and the fourth scan line GCi. Therefore, the voltage of the first node N1 is not changed.

At a time t8*a*, as a scan signal of a turn-on level (low level) is applied to the second scan line GBi, the seventh transistor T7 and the eighth transistor T8 may be turned on. As the seventh transistor T7 is turned on, the anode initialization voltage VAINT may be applied to the anode of the light-emitting element LD, and the light-emitting element LD may be initialized to a charge quantity corresponding to the voltage difference between the anode initialization voltage VAINT and the first power voltage ELVSS. Accordingly, the low grayscale expression of the light-emitting element LD can be readily implemented.

In addition, as the eighth transistor T8 is turned on, the voltage of the second node N2 may be set as the bias voltage VOBS. Accordingly, because the bias voltage VOBS is applied to the source electrode of the first transistor T1, the hysteresis phenomenon can be reduced or prevented, and the on-bias state can be ensured.

At a time t9*a*, as an emission signal of a turn-on level (low level) is applied to the emission line EMi, the fifth transistor T5 and the sixth transistor T6 may be turned on. Therefore, a path of driving current may be formed, which flows toward the first power voltage ELVSS from the second power voltage ELVDD via the fifth transistor T5, the first transistor T1, the sixth transistor T6, and the light-emitting element LD.

An amount of driving current may be adjusted according to a voltage maintained in the storage capacitor Cst. Because the voltage of the first node N1, which is written during the address scan period AS, is maintained during the self-scan period SS, a luminance of the pixel PXij in the self-scan period SS is equal to a luminance of the pixel PXij in the address scan period AS.

Figure 7:
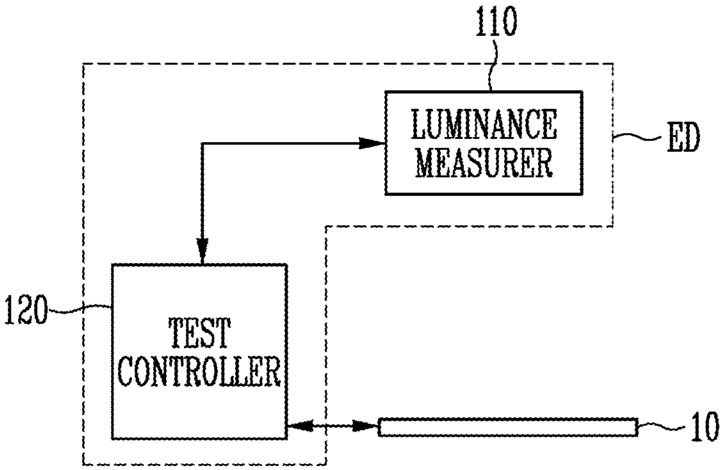
FIG. 7 is a diagram illustrating a voltage-setting device in accordance with one or more embodiments of the present disclosure.
Figure 8:
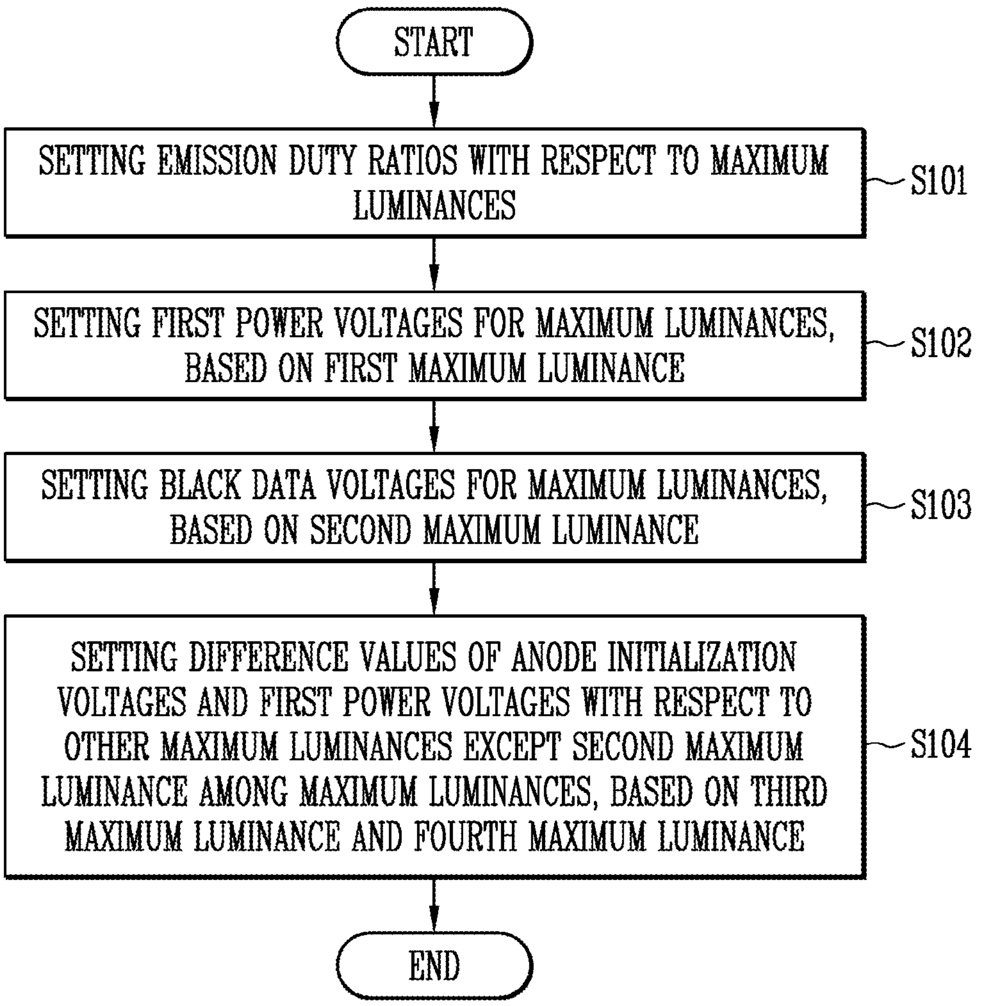

FIG. 7 is a diagram illustrating a voltage-setting device in accordance with one or more embodiments of the present disclosure.

Referring to FIG. 7, the voltage-setting device ED may include a luminance measurer 110 and a test controller 120. The test controller 120 may be configured as a general-purpose or dedicated computing device. The computing device may include a recording medium and a processor. The recording medium and the processor may be included in the physically same device, but be included in physically different devices, using a clouding technology or the like. The luminance measurer 110 may be configured as a camera or a luminance meter.

The recording medium may include data readable by the processor or all kinds of recording devices in which a program can be stored. Examples of the recording medium readable by the processor may be a ROM, a RAM, a CD-ROM, a magnetic tape, a floppy disk, an optical data storage, a hard disk, an external hard disk, an SSD, a USB storage device, a DVD, a blue-ray disk, and the like. Also, the recording medium readable by the processor may be a combination of a plurality of devices, and may be distributed in a computer system connected to a network. The recording medium may be a non-transitory computer readable medium. The non-transitory computer readable medium means a medium readable by the process, which does not store data or program for a short time, such as a register, a cache, and a memory, but semi-permanently stores the data or program.

The test controller 120 may provide test voltages to the display device 10, or may control the display device 10 to generate test voltages. The luminance measurer 110 may photograph an image displayed by the display device 10, or may measure a luminance, based on the test voltages.

The test controller 120 may set, to voltage values of the display device 10, test voltages determined to be suitable for the display device 10. The set voltage values may be stored in a memory of the display device 10.

FIGS. 8 to 12 are diagrams illustrating a voltage-setting method in accordance with one or more embodiments of the present disclosure.

The display device 10 may display an image based on a selected maximum luminance among maximum luminances (e.g., about 4 nits to about 2175 nits). As described above, the maximum luminance may be manually set by manipulation of a user on the display device 10, or be automatically set by an algorithm linked with an illumination sensor or the like. Even with respect to the same grayscale, a data voltage varies according to the maximum luminance, and therefore, an emission luminance of the pixel also varies.

However, when various voltages are tested one by one with respect to the maximum luminances (e.g., about 4 nits to about 2175 nits), excessively much tact time is required, and therefore, an efficient voltage-setting method is necessary.

First, the voltage-setting device ED or the display device 10 may set emission duty ratios with respect to the maximum luminances (e.g., about 4 nits to about 2175 nits) (S101).

An emission duty ratio represents, as a ratio, a period in which each pixel PXij emits light for one frame period. For example, when a pixel emits light during 80% of the one frame period, the emission duty ratio may become 80%. In another example, when a pixel emits light during 5% of the one frame period, the emission duty ratio may become 5%. Referring to FIG. 5, when the emission signal applied to the emission line EMi has a low level, the fifth transistor T5 and the sixth transistor T6 may be turned on, and a driving current may be supplied to the light-emitting element LD. Therefore, in the case of the display device 10 including the pixel PXij shown in FIG. 2, a ratio of a period in which the emission signal has the low level during one frame period may become the emission duty ratio.

With respect to maximum luminances (e.g., about 4 nits to about 100 nits) less than or equal to a third maximum luminance ML3, the emission duty ratio (e.g., about 8.9% to about 89%) may be set smaller as the maximum luminance becomes smaller. Therefore, in the case of the maximum luminances (e.g., about 4 nits to about 100 nits), the luminance of the display device 10 may be adjusted using the emission duty ratio even when differences between second power voltages ELVDD and first power voltages ELVSS are the same. The same emission duty ratio (about 8.9%) may be set with respect to some adjacent maximum luminances (e.g., 4 nits and 10 nits).

Meanwhile, with respect to maximum luminances (100 nits to 2175 nits) that are greater than or equal to the third maximum luminance ML3, the same emission duty ratio (e.g., about 89%) may be set. The same emission duty ratio may be a maximum value (e.g., about 89%) among the set emission duty ratios (e.g., about 8.9% to about 89%).

As such, the third maximum luminance ML3 is a boundary luminance between the maximum luminances (e.g., about 4 nits to about 100 nits) with respect to which the luminance is adjusted using the emission duty ratio and the maximum luminances (e.g., about 100 nits to about 2175 nits) with respect to which the luminance is adjusted using the first power voltage ELVSS, and may be determined as an appropriate maximum luminance (e.g., 100 nits) by considering power consumption, emission efficiency, and the like. In one or more embodiments, the second power voltage ELVDD may have a fixed value.

Next, the voltage-setting device ED may set first power voltages ELVSS for the maximum luminances (e.g., about 4 nits to about 2175 nits) based on a first power voltage ELVSS for a first maximum luminance ML1 (S102). For example, the first maximum luminance ML1 may be set as a maximum luminance (e.g., about 650 nits) when the user of the display device 10 most frequently uses.

For example, the test controller 120 may control the display device 10 to display a white image. For example, the test controller 120 may change the first power voltage ELVSS such that a luminance measured by luminance measurer 110 becomes 650 nits.

Even with respect to display devices 10 of the same model, magnitudes of first power voltages ELVSS required to express the first maximum luminance ML1 may be different from each other according to a process variation. For example, the process variation may exist according to positions on a mother substrate, and magnitudes of first power voltages ELVSS required to express the first maximum luminance ML1 may be different from each other even with respect to display devices 10 of the same model. Therefore, the first power voltage ELVSS may be set in a range (a minimum value to a maximum value) that can satisfy a plurality of display devices 10 with respect to the first maximum luminance ML1. The minimum value and the maximum value are based on an absolute value of a numerical value. In each of the display devices 10, a first power voltage ELVSS may be individually set within the set range with respect to the first maximum luminance ML1.

The voltage-setting device ED may not perform any additional test on other maximum luminances (e.g., about 4 nits to about 300 nits and/or about 1200 nits to about 2175 nits) not including the first maximum luminance ML1. The voltage-setting device ED may add or subtract an offset value to or from the determined first power voltage ELVSS with respect to the first maximum luminance ML1, thereby determining first power voltages ELVSS with respect to the other maximum luminances (e.g., about 4 nits to about 300 nits and/or about 1200 nits to about 2175 nits).

For example, with respect to the maximum luminances (e.g., about 100 nits to about 2175 nits) greater than or equal to the third maximum luminance ML3, the first power voltage ELVSS may be set larger as the maximum luminance becomes larger. The magnitude of the first power voltage ELVSS is based on an absolute value. Therefore, in the case of the maximum luminances (e.g., about 100 nits to about 2175 nits), the luminance of the display device 10 may be adjusted using differences between second power voltages ELVDD and first power voltages ELVSS even with respect to the same emission duty ratio. The same first power voltage ELVSS may be set with respect to some adjacent maximum luminances (e.g., about 1600 nits to about 2175 nits).

With respect to the maximum luminances (e.g., about 4 nits to about 100 nits) less than or equal to the third maximum luminance ML3, the same first power voltage ELVSS may be set.

Next, the voltage-setting device ED may set black data voltages for the maximum luminances (e.g., about 4 nits to about 2175 nits) based on a black data voltage for a second maximum luminance ML2 (S103). The first maximum luminance ML1, the second maximum luminance ML2, the third maximum luminance ML3, and a fourth maximum luminance ML4 may be different from one another. For example, the second maximum luminance ML2 may be greater than each of the first maximum luminance ML1, the third maximum luminance ML3, and the fourth maximum luminance ML4. With respect to the brightest maximum luminance (e.g., about 2175 nits) among the maximum luminances (e.g., about 4 nits to about 2175 nits), black image expression may be weakest (e.g., black excitation may easily occur). Therefore, the second maximum luminance ML may be set as the maximum luminance (e.g., about 2175 nits).

With respect to the second maximum luminance ML2, difference values VAR_RG and VAR_B of anode initialization voltages VAINT and first power voltages ELVSS may be set. The anode initialization voltage VAINT may be higher than the first power voltage ELVSS, and therefore, the difference values VAR_RG and VAR_B may be positive numbers. For example, a difference value VAR_RG of the first color and the second color may be set to about 0.25V, and a difference value VAR_B of the third color may be set to about 1.00V. For example, 0.25V may be a minimum value among the difference values VAR_RG. For example, 1.00V may be a minimum value among the difference values VAR_B.

It may be advantageous that low grayscale expression is suitably implemented as the difference value of the first power voltages ELVSS becomes smaller. For example, the black excitation can be reduced. Meanwhile, it may be advantageous that the response speed of the pixel PXij increases and the temperature sensitivity of the pixel PXij decreases as the difference value becomes larger. By synthetically considering these advantages, the difference values VAR_RG and VAR_B may be set relatively small with respect to the second maximum luminance ML2 which is weak to the black excitation.

The voltage-setting device ED may repeatedly test arbitrary black data voltages (e.g., about 4.8V to about 6.2V) with respect to the difference values VAR_RG and VAR_B set with respect to the second maximum luminance ML2, thereby setting a black data voltage for the second maximum luminance ML2 such that a black image is displayed. For example, the voltage-setting device ED may check whether the luminance of the black image becomes a reference value or less while gradually increasing an arbitrary black data voltage from 4.8V. When the luminance of the black image is decreased to the reference value or less, the voltage-setting device ED may determine the corresponding arbitrary black data voltage as the black data voltage for the second maximum luminance ML2. Because the luminance measurement time of the luminance measurer 110 decreases as a display image becomes brighter, it may be advantageous to test the arbitrary black data voltage by gradually increasing the arbitrary black data voltage from a minimum value to a maximum value.

Next, the voltage-setting device ED may apply offsets with respect to the black data voltage for the second maximum luminance ML2, thereby setting black data voltages for the other maximum luminances (about 4 nits to about 1600 nits). That the offsets are applied to the black data voltage for the second maximum luminance ML2 may mean that the offsets are added to the black data voltage for the second maximum luminance ML2. The offsets may have values of about 0 or less. For example, when a black data voltage of the first color for the second maximum luminance ML2 is set as about 6.0V, a black data voltage of the first color for a maximum luminance (30 nits) may be set as about 5.962V. For example, the black data voltage may be set smaller as the maximum luminance becomes smaller.

Next, the voltage-setting device ED or the display device 10 may set difference values VAR_RG and VAR_B of anode initialization voltages VAINT and first power voltage ELVSS with respect to the other maximum luminances (e.g., about 4 nits to about 1600 nits) except the second maximum luminance ML2 among the maximum luminances (e.g., about 4 nits to about 2175 nits) based on a difference value for the third maximum luminance ML3 and a difference value for the fourth maximum luminance ML4 (S104).

First, the voltage-setting device ED may repeatedly test arbitrary difference values T_VAR_RG and T_VAR_B based on a black data voltage set with respect to the third maximum luminance ML3, thereby setting difference values VAR_RG and VAR_B with respect to the third maximum luminance ML3 such that a black image is displayed. For example, with respect to the third maximum luminance ML3, a range of arbitrary difference values T_VAR_RG of the first color and the second color may be about 0.3V to about 0.5V. For example, with respect to the third maximum luminance ML3, a range of arbitrary difference values T_VAR_B of the third color may be about 1.05V to about 1.15V. Referring to FIG. 10, pairs of the arbitrary difference values T_VAR_RG and T_VAR_B may be set. For example, when the arbitrary difference value T_VAR_RG is 0.3V, the arbitrary difference value T_VAR_B may be set to 1.05V. For example, when the arbitrary difference value T_VAR_RG is about 0.4V, the arbitrary difference value T_VAR_B may be set to about 1.10V. However, the pairs of the arbitrary difference values T_VAR_RG and T_VAR_B may be determined by a relation, such as the following Equation 1.

$$T\_VAR\_B = T\_VAR\_RG * 0.2 + 1.15 \quad \text{Equation 1}$$

Arbitrary difference values T_VAR_B evaluated according to Equation 1 are unrelated to numerical values shown in FIG. 10. Equation 1 is merely illustrative, and a multiplied constant (e.g., 0.2) and an added constant (e.g., 1.15) may be changed.

In one or more embodiments, the voltage-setting device ED may check whether the luminance of the black image becomes the reference value or less while gradually decreasing arbitrary difference values T_VAR_RG and T_VAR_B respectively from about 0.5V and about 1.15V. When the luminance of the black image is decreased to the reference value or less, the voltage-setting device ED may determine the corresponding arbitrary difference values T_VAR_RG and T_VAR_B as the difference values T_VAR_RG and T_VAR_B with respect to the third maximum luminance ML3. Because the luminance measurement time of the luminance measurer 110 decreases as the display image becomes brighter, it may be advantageous to test the arbitrary difference values T_VAR_RG and T_VAR_B by gradually decreasing the arbitrary difference values T_VAR_RG and T_VAR_B from a minimum value to a maximum value.

Next, when first difference values VAR_RG of maximum luminances (about 200 nits to about 1600 nits) less than the second maximum luminance ML2 and greater than the third maximum luminance ML3 are set, the voltage-setting device ED or the display device 10 may perform first interpolation on a difference value VAR_RG set with respect to the second maximum luminance ML2 and a difference value VAR_RG set with respect to the third maximum luminance ML3. As described above, the difference value VAR_RG may be set as about 0.25V with respect to the second maximum luminance ML2 (see the operation S103). A case where the difference value VAR_RG is set to about 0.40V with respect to the third maximum luminance ML3 through luminance measurement is described. The first difference values VAR_RG with respect to the maximum luminances (e.g., about 200 nits to about 1600 nits) may be set to values between about 0.25V to about 0.40V.

Figure 11:
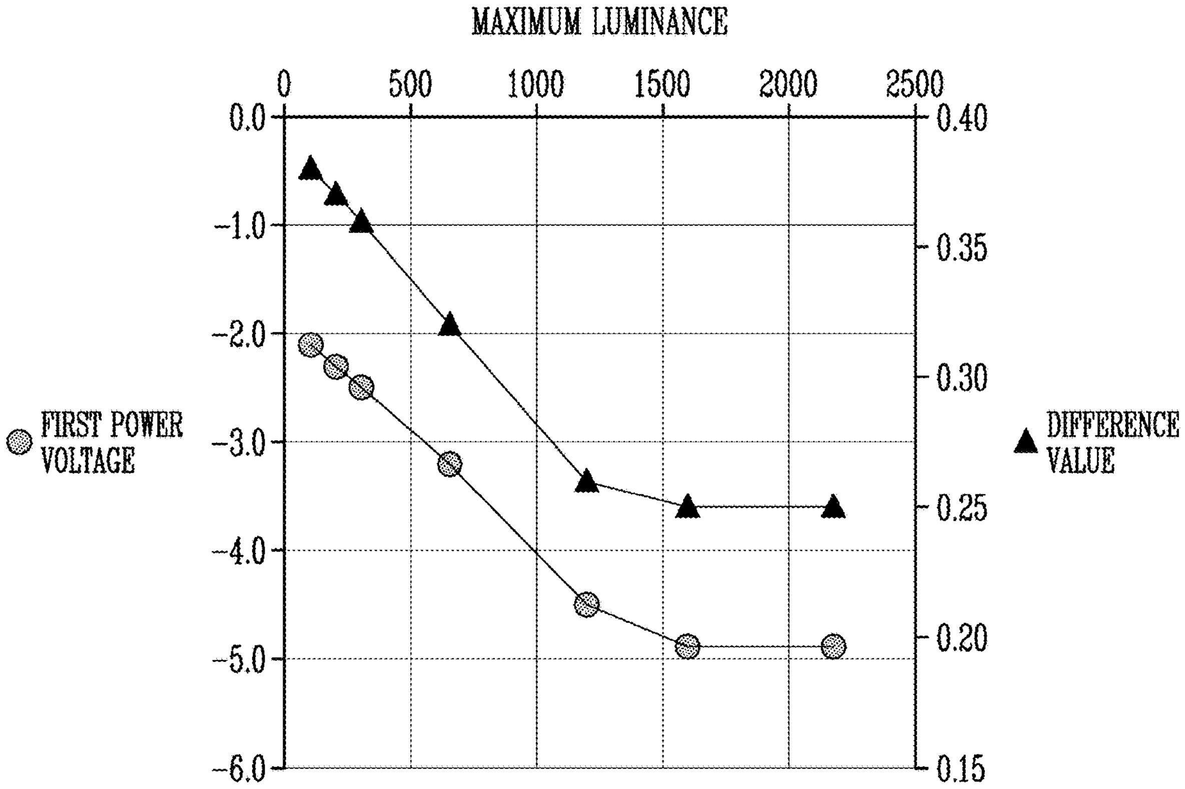

The first interpolation may be performed such that a difference between the first difference values VAR_RG is in proportion to a difference between first power voltages ELVSS of corresponding maximum luminances. Referring to FIG. 11, it can be seen that a graph of difference values VAR_RG with respect to maximum luminances shows a similar tendency as compared with a graph of first power voltages ELVSS with respect to maximum luminances. For example, a first difference value VAR_RG with respect to a target maximum luminance (e.g., one of about 200 nits to about 1600 nits) may be derived by the following Equation 2.

$$VAR\_X1 = VAR\_2175 + (ELVSS\_X1 - ELVSS\_2175) * (VAR\_100 - VAR\_2175)/(ELVSS\_100 - ELVSS\_2175) \quad \text{Equation 2}$$

In Equation 2, VAR_X1 may be the first difference value VAR_RG with respect to the target maximum luminance. VAR_2175 may be a first difference value VAR_RG with respect to the second maximum luminance ML2. For example, VAR_2175 may be 0.25 in FIG. 9. In Equation 2, ELVSS_X1 may be a first power voltage ELVSS with respect to the target maximum luminance. The first power voltage ELVSS with respect to the target maximum luminance may be set in the operation S102. In Equation 2, ELVSS_2175 may be a first power voltage ELVSS with respect to the second maximum luminance ML2. The first power voltage ELVSS with respect to the second maximum luminance ML2 may be set in the operation S102. In Equation 2, VAR_100 may be a first difference value VAR_RG with respect to the third maximum luminance ML3. The first difference value VAR_RG with respect to the third maximum luminance ML3 may be determined through luminance measurement before the first interpolation in the operation S104. In Equation 2, ELVSS_100 may be a first power voltage ELVSS with respect to the third maximum luminance ML3. The first power voltage ELVSS with respect to the third maximum luminance ML3 may be set in the operation S102.

First difference values VAR_B of the third color may be determined through various methods. For example, after the first difference values VAR_RG of the first color and the second color are determined, the first difference values VAR_B of the third color may be determined through the relation, such as Equation 1. Alternatively, after the first difference values VAR_RG of the first color and the second color are determined, the first difference values VAR_B of the third color may be determined with reference to a lookup table VAR_LUT shown in FIG. 10. Alternatively, with respect to the first difference values VAR_B of the third color, the first difference values VAR_B of the third color may be determined by performing the first interpolation, such as Equation 2.

In one or more embodiments, at least one maximum luminance with respect to which the smallest emission duty ratio (e.g., about 8.9%) among the emission duty ratios is set may be set as the fourth maximum luminance ML4. When the number of at least one maximum luminance (e.g., about 4 nits and about 10 nits) is two or more, the largest maximum luminance (e.g., about 10 nits) among the at least one maximum luminance (e.g., about 4 nits and about 10 nits) may be set as the fourth maximum luminance ML4.

First, the voltage-setting device ED may repeatedly test arbitrary difference values T_VAR_RG and T_VAR_B based on a black data set with respect to the fourth maximum luminance ML4, thereby setting difference values VAR_RG and VAR_B with respect to the fourth maximum luminance ML4 such that a black image is displayed.

For example, with respect to the fourth maximum luminance ML4, the range of arbitrary difference values T_VAR_RG of the first color and the second color may be about 0.5V to about 1.2V. For example, with respect to the fourth maximum luminance ML4, the range of arbitrary difference values T_VAR_B of the third color may be about 1.15V to about 1.50V. Referring to FIG. 10, pairs of arbitrary difference values T_VAR_RG and T_VAR_B may be set. For example, when an arbitrary difference value T_VAR_RG is 0.5V, an arbitrary difference value T_VAR_B may be set to about 1.15V. For example, when an arbitrary difference value T_VAR_RG is about 0.6V, an arbitrary difference value T_VAR_B may be set to about 1.20V. In addition, the pairs of arbitrary difference values T_VAR_RG and T_VAR_B may be determined by the relation, such as the above-described Equation 1.

For example, the voltage-setting device ED may check whether the luminance of the black image becomes the reference value or less while gradually decreasing arbitrary difference values T_VAR_RG and T_VAR_B respectively from 1.2V and 1.50V. When the luminance of the black image is decreased to the reference value or less, the voltage-setting device ED may determine the corresponding arbitrary difference values T_VAR_RG and T_VAR_B as the difference values T_VAR_RG and T_VAR_B with respect to the fourth maximum luminance ML4. Because the luminance measurement time of the luminance measurer 110 decreases as the display image becomes brighter, it may be advantageous to test the arbitrary difference values T_VAR_RG and T_VAR_B by gradually decreasing the arbitrary difference values T_VAR_RG and T_VAR_B from a minimum value to a maximum value.

Next, when first difference values VAR_RG of maximum luminances (e.g., about 15 nits to about 90 nits) less than the third maximum luminance ML3 and greater than the fourth maximum luminance ML4 are set, the voltage-setting device ED or the display device 10 may perform second interpolation on a difference value VAR_RG set with respect to the third maximum luminance ML3 and a difference value VAR_RG set with respect to the fourth maximum luminance ML4.

A case where the difference value VAR_RG is set to about 0.40V with respect to the third maximum luminance ML3 through luminance measurement is described. In addition, a case where the difference value VAR_RG is set to about 1.10V with respect to the fourth maximum luminance ML4 through luminance measurement is described. The second difference values VAR_RG with respect to the maximum luminances (e.g., about 15 nits to about 90 nits) may be set to values between about 0.40V to about 1.10V.

The second interpolation may be performed such that a difference between the second difference values VAR_RG is in proportion to a difference between emission duty ratios of corresponding maximum luminances. That is, because first power voltages ELVSS with respect to the maximum luminances (e.g., about 15 nits to about 90 nits) on which the second interpolation is to be performed are equally set, interpolation cannot be performed to be in proportion to a difference between first power voltages ELVSS. Therefore, unlike the first interpolation, the second interpolation may be performed in proportion to a difference between emission duty ratios. With respect to maximum luminances (e.g., about 4 nits to about 10 nits) having the same emission duty ratio, the same difference values VAR_RG may be set.

Figure 12:
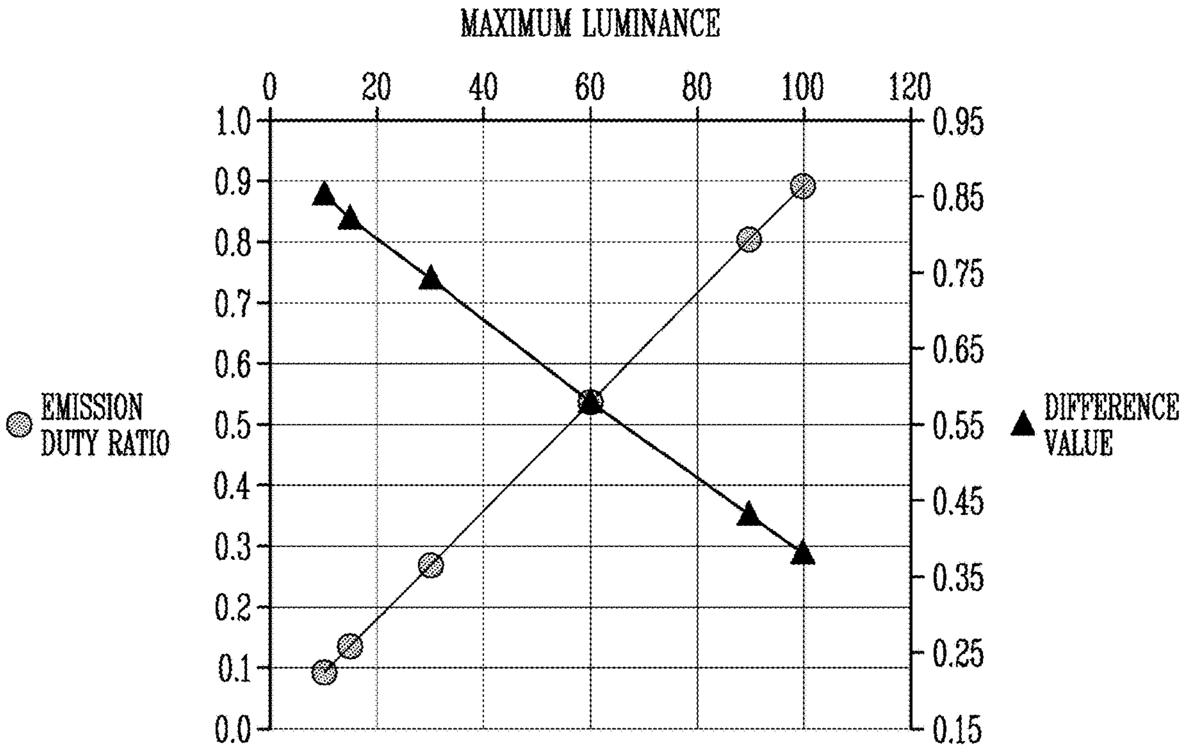

Referring to FIG. 12, it can be seen that a graph of difference values VAR_RG with respect to maximum luminances shows a similar tendency as compared with a graph of emission duty ratios with respect to maximum luminances. However, when the slope of the graph of difference values VAR_RG with respect to maximum luminances is a negative number, the slope of the graph of emission duty ratios with respect to maximum luminances may be a positive number. The signs of the slopes may be opposite to each other. For example, a second difference value VAR_RG with respect to a target maximum luminance (e.g., one of about 15 nits to about 90 nits) may be derived by the following Equation 3.

$$VAR\_X2 = VAR\_100 + (AOR\_X2 - AOR\_100) * (VAR\_10 - VAR\_100)/(AOR\_10 - AOR\_100) \quad \text{Equation 3}$$

In Equation 3, VAR_X2 may be the second difference value VAR_RX with respect to the target maximum luminance. In Equation 3, VAR_100 may be a difference value VAR_RG with respect to the third maximum luminance ML3. The difference value VAR_RG with respect to the third maximum luminance ML3 may be determined through luminance measurement before the first interpolation in the operation S104. In Equation 3, AOR_X2 may be an emission duty ratio with respect to the target maximum luminance. The emission duty ratio with respect to the target maximum luminance may be set in the operation S101. In Equation 3, AOR_100 may be an emission duty ratio with respect to the third maximum luminance ML3. The emission duty ratio with respect to the third maximum luminance ML3 may be set in the operation S101. In Equation 3, VAR_10 may be a difference value VAR_RG of the fourth maximum luminance ML4. The difference value VAR_RG of the fourth maximum luminance ML4 may be determined through luminance measurement before the second interpolation in the operation S104. In Equation 3, AOR_10 may be an emission duty ratio with respect to the fourth maximum luminance ML4. The emission duty ratio with respect to the fourth maximum luminance ML4 may be set in the operation S101.

Second difference values VAR_B of the third color may be determined through various methods. For example, after the second difference values VAR_RG of the first color and the second color are determined, the second difference values VAR_B of the third color may be determined through the relation, such as Equation 1. Alternatively, after the second difference values VAR_RG of the first color and the second color are determined, the second difference values VAR_B of the third color may be determined with reference to the lookup table VAR_LUT shown in FIG. 10. Alternatively, with respect to the second difference values VAR_B of the third color, the second difference values VAR_B of the third color may be determined by performing the second interpolation, such as Equation 3.

In one or more embodiments, the voltage-setting method may include an additional operation after the operation S104. For example, the additional operation may be an operation of adding a margin value to the black data voltage with respect to the second maximum luminance ML2. For example, the margin value may be about 0.3V. When the black data voltage with respect to the second maximum luminance ML2 is determined as about 6.0V, the black data voltage with respect to the second maximum luminance ML2 may be adjusted to about 6.3V in the additional operation.

As described in the operation S103, the black data voltages with respect to the maximum luminances (e.g., about 4 nits to about 1600 nits) may be set to values obtained by adding an offset to the black data voltages with respect to the second maximum luminance ML2. Therefore, according to the additional operation, margin values of black data voltages can be added in all maximum luminances, and the likelihood of the black excitation can be more effectively reduced or prevented.

FIG. 13 is a diagram illustrating a voltage-setting method in accordance with one or more other embodiments of the present disclosure.

Referring to FIG. 13, it can be seen that a difference value VAR_R of the first color, a difference value VAR_G of the second color, and a difference value VAR_B of the third color may be individually set.

One or more embodiments may be applied to a display device in which different anode initialization voltages VAINT are supplied to a pixel PXij including a light-emitting element LD of the first color, a pixel PXij including a light-emitting element LD of the second color, and a pixel PXij including a light-emitting element LD of the third color.

In the voltage-setting method for the display device in accordance with the present disclosure, the likelihood of black excitation can be reduced or prevented.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A voltage-setting method for a display device for displaying an image based on a selected maximum luminance among maximum luminances, the voltage-setting method comprising:

setting emission duty ratios with respect to the maximum luminances;

setting first power voltages with respect to the maximum luminances based on a first maximum luminance;

setting black data voltages with respect to the maximum luminances based on a second maximum luminance; and setting difference values of anode initialization voltages and the first power voltages with respect to ones of the maximum luminances other than the second maximum luminance based on a third maximum luminance and a fourth maximum luminance, wherein the setting the emission duty ratios, the setting the first power voltages, the setting black data voltages, and the setting the difference values are sequentially performed.

2. The voltage-setting method of claim 1, wherein the second maximum luminance, the third maximum luminance, and the fourth maximum luminance are different.

3. The voltage-setting method of claim 2, wherein the second maximum luminance is greater than each of the third maximum luminance and the fourth maximum luminance.

4. The voltage-setting method of claim 3, wherein the second maximum luminance is a maximum value among the maximum luminances.

5. The voltage-setting method of claim 3, further comprising setting a same first power voltage with respect to ones of the maximum luminances that are less than or equal to the third maximum luminance.

6. The voltage-setting method of claim 5, further comprising setting a same emission duty ratio with respect to ones of the maximum luminances that are greater than or equal to the third maximum luminance.

7. The voltage-setting method of claim 6, further comprising setting at least one maximum luminance, for which a smallest one of the emission duty ratios is set, as the fourth maximum luminance.

8. The voltage-setting method of claim 7, further comprising setting a largest one of the at least one maximum luminance as the fourth maximum luminance.

9. A voltage-setting method for a display device for displaying an image based on a selected maximum luminance among maximum luminances, the voltage-setting method comprising:

setting emission duty ratios with respect to the maximum luminances;

setting first power voltages with respect to the maximum luminances based on a first maximum luminance;

setting black data voltages with respect to the maximum luminances based on a second maximum luminance;

setting difference values of anode initialization voltages and the first power voltages with respect to ones of the maximum luminances other than the second maximum luminance based on a third maximum luminance and a fourth maximum luminance;

setting a same first power voltage with respect to ones of the maximum luminances that are less than or equal to the third maximum luminance;

setting a same emission duty ratio with respect to ones of the maximum luminances that are greater than or equal to the third maximum luminance;

setting at least one maximum luminance, for which a smallest one of the emission duty ratios is set, as the fourth maximum luminance;

setting first difference values with respect to maximum luminances that are less than the second maximum luminance and that are greater than the third maximum luminance; and performing first interpolation using a difference value set with respect to the second maximum luminance and a difference value set with respect to the third maximum luminance, wherein the second maximum luminance is greater than the third maximum luminance and is greater than the fourth maximum luminance, and the third maximum luminance and the fourth maximum luminance are different.

10. The voltage-setting method of claim 9, wherein the first interpolation is performed such that a difference between the first difference values is proportional to a difference between first power voltages with respect to corresponding maximum luminances.

11. The voltage-setting method of claim 10, further comprising:

setting second difference values with respect to maximum luminances less than the third maximum luminance and greater than the fourth maximum luminance; and performing second interpolation using a difference value set with respect to the third maximum luminance and a difference value set with respect to the fourth maximum luminance.

12. The voltage-setting method of claim 11, wherein the second interpolation is performed such that a difference between the second difference values is proportional to a difference between emission duty ratios with respect to corresponding maximum luminances.

13. The voltage-setting method of claim 1, further comprising:

selecting a difference value of an anode initialization voltage and a first power voltage with respect to the second maximum luminance;

repeatedly testing test black data voltages based on the difference value with respect to the second maximum luminance;

setting a black data voltage with respect to the second maximum luminance; and displaying a black image.

14. The voltage-setting method of claim 13, further comprising:

applying offsets based on the black data voltage with respect to the second maximum luminance; and setting black data voltages with respect to other ones of the maximum luminances.

15. The voltage-setting method of claim 14, further comprising:

repeatedly testing test difference values based on a black data voltage set with respect to the third maximum luminance;

setting a difference value with respect to the third maximum luminance; and displaying a black image.

16. The voltage-setting method of claim 15, further comprising:

repeatedly testing test difference values based on a black data voltage set with respect to the fourth maximum luminance;

setting a difference value with respect to the fourth maximum luminance; and displaying a black image.

17. A voltage-setting method for a display device for displaying an image based on a selected maximum luminance among maximum luminances, the voltage-setting method comprising:

setting emission duty ratios with respect to the maximum luminances;

setting first power voltages with respect to the maximum luminances based on a first maximum luminance;

setting black data voltages with respect to the maximum luminances based on a second maximum luminance;

setting difference values of anode initialization voltages and the first power voltages with respect to ones of the maximum luminances other than the second maximum luminance based on a third maximum luminance and a fourth maximum luminance;

selecting a difference value of an anode initialization voltage and a first power voltage with respect to the second maximum luminance;

repeatedly testing test black data voltages based on the difference value with respect to the second maximum luminance;

setting a black data voltage with respect to the second maximum luminance;

displaying a black image;

applying offsets based on the black data voltage with respect to the second maximum luminance;

setting black data voltages with respect to other ones of the maximum luminances;

repeatedly testing test difference values based on a black data voltage set with respect to the third maximum luminance;

setting a difference value with respect to the third maximum luminance;

displaying a black image;

repeatedly testing test difference values based on a black data voltage set with respect to the fourth maximum luminance;

setting a difference value with respect to the fourth maximum luminance;

displaying a black image;

setting first difference values with respect to maximum luminances that are less than the second maximum luminance and that are greater than the third maximum luminance; and performing first interpolation using the difference value set with respect to the second maximum luminance and the difference value set with respect to the third maximum luminance such that a difference between the first difference values is in proportion to a difference between first power voltages with respect to corresponding maximum luminances.

18. The voltage-setting method of claim 17, further comprising:

setting second difference values with respect to maximum luminances less than the third maximum luminance and greater than the fourth maximum luminance; and performing second interpolation using the difference value set with respect to the third maximum luminance and the difference value set with respect to the fourth maximum luminance, wherein the second interpolation is performed such that a difference between the second difference values is in proportion to a difference between emission duty ratios with respect to corresponding maximum luminances.

19. The voltage-setting method of claim 1, wherein the first maximum luminance, the second maximum luminance, the third maximum luminance, and the fourth maximum luminance are different.

20. The voltage-setting method of claim 19, wherein the second maximum luminance is greater than each of the first maximum luminance, the third maximum luminance, and the fourth maximum luminance.

* * * * *